(12) United States Patent
Barlian et al.

(10) Patent No.: US 6,601,000 B1
(45) Date of Patent: Jul. 29, 2003

(54) DEVICE AND METHOD FOR VOLUME DETERMINATION

(75) Inventors: Reinhold Barlian, Bad Mergentheim (DE); Alfred Boehm, Viechtach (DE); Gerd Boehm, Viechtach (DE); Johann Bretzendorfer, Deggendorf (DE); Alfons Brueggemann, Spelle (DE)

(73) Assignee: Bartec Logistic Management GmbH, Ahlen (DE)

( * ) Notice: Subject to any disclaimer, the term of this patent is extended or adjusted under 35 U.S.C. 154(b) by 0 days.

(21) Appl. No.: 09/744,966

(22) PCT Filed: Jul. 15, 1999

(86) PCT No.: PCT/EP99/05065

§ 371 (c)(1),
(2), (4) Date: Feb. 13, 2001

(87) PCT Pub. No.: WO00/12972

PCT Pub. Date: Mar. 9, 2000

(30) Foreign Application Priority Data

Aug. 27, 1998 (DE) .......................................... 198 39 112

(51) Int. Cl.⁷ .............................................. G01F 25/00
(52) U.S. Cl. ........................ 702/55; 702/45; 73/861.64; 73/290 R
(58) Field of Search .............................. 702/45, 47, 50, 702/55, 115; 73/862.333, 862.623, 861.04, 204.22, 861.64, 290 R

(56) References Cited

U.S. PATENT DOCUMENTS 5,757,664 A    5/1998    Rogers et al. .............. 364/509

FOREIGN PATENT DOCUMENTS

| DE | 26 45 967 A1 | 4/1978 | .......... G01F/15/08 |
| DE | 28 35 036 A1 | 2/1980 | .......... G01F/23/00 |
| DE | 33 19 277 A1 | 11/1984 | ............ G05D/9/02 |
| DE | 40 20 725 A1 | 3/1991 | ............ A01J/11/04 |
| DE | 42 43 077 C2 | 6/1993 | ............ G01N/1/14 |
| EP | 0 806 636 A1 | 11/1997 | ......... G01F/23/296 |
| EP | 0 626 567 B1 | 1/1998 | ............. G01F/1/58 |
| GB | 1 512 807 | 6/1978 | |
| WO | WO 83/04407 | 6/1982 | .......... G01F/15/08 |
| WO | WO 00/12972 | 3/2000 | .......... G01F/23/00 |

*Primary Examiner*—Kamini Shah
(74) *Attorney, Agent, or Firm*—Jacobson Holman PLLC

(57) ABSTRACT

A device for conveying a medium from a container to a tank and for determining the quantity of the medium, having a conduit between the container and the tank, a conveying device connected to the conduit and a device for separating gas from the medium, the device for separating the gas and the tank forming an integrated unit, a filling level measuring device being provided substantially in the interior of the tank for determining the position of at least one boundary surface of the medium in the tank and the filling level measuring device has at least one dipstick. Method for conveying a medium from a container into a tank and for determining the quantity of the medium, in which the medium is transported via a conveying device and a conduit and gas absorbed by the medium is separated, gas separation at least partly taking place in the tank and the filling level in the tank is measured by a filling level measuring device.

28 Claims, 6 Drawing Sheets

DEVICE AND METHOD FOR VOLUME DETERMINATION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The invention relates to a device for conveying a medium from a container into a tank and for determining the quantity of the medium, having a conduit between the container and the tank, a conveying device connected to the conduit and a device for separating gas from the medium. The invention also relates to a method for conveying a medium from a container into a tank and for determining the quantity of the medium, in which the medium is transported via a conveying device and a conduit and gas absorbed by the medium is separated.

Such devices and methods are used in the most varied fields, such as e.g. in dairying or the distribution of fuels.

In the dairying sector a tank truck regularly visits certain milk producers and removes there the milk which has e.g. been produced during the course of a day from one or more storage containers. It is particularly important that the milk quantity removed is precisely measured and recorded, because it is on this basis that a subsequent settlement of account takes place between producer and customer. Therefore high demands are made on the quality of the quantity measurement, which is illustrated by the fact that legal regulations exist with regards to the calibrations and the quality of the measured results.

In order to meet these high demands it is necessary to minimize possible measurement errors. A particularly serious measurement error only eliminatable with a certain apparatus expenditure results from the fact that e.g. the milk is enriched with air during the removal process by pumps or the like and this leads to a more or less pronounced frothing of the milk. Thus, prior to the actual quantity measurement air separation must take place. Therefore in most prior art devices and methods the milk is firstly supplied to an air separator, where it remains until adequate degassing has occurred and is only then supplied via a flowmeter to the tank to be filled.

(2) Description of the Related Art Including Information Disclosed Under 37 CFR 1.97 and 1.98

In the Federal Republic of Germany there is e.g. a standard (DIN 19217: 1997-11), which contains strict regulations relating to air separation (cf. therein section 2.10.2). The technical features given in the DIN form the preambles of the independent claims. The DIN prescribes that in order to fulfil the calibration requirement the gas separator must be a separate component of the installation. This leads to problematic high apparatus costs. In addition, in the case of installations having a separate gas separator, as prescribed by the DIN, the aforementioned time lag problem occurs during the conveying of the medium, because it must in the meantime remain in the air separator. Thus, EP 626 567 B1 already proposes a flowmeter, which even in the case of air-freighted milk is able to sufficiently accurately determine the volume. However, this intrinsically satisfactorily operating device and the method performed by it are comparatively complicated and consequently require improvement.

DE 33 19 277 A1 discloses a float for a level control provided in an inner chamber of a milk container. The milk level is determined in that the float interior contains a magnet, which interacts with a permanent magnet inside a dipstick.

EP 806 636 A1 also discloses a device for determining the level, in this case in aircraft tanks. This device has the noteworthy feature that the level determination functions according to the so-called magnetostrictive principle, i.e. according to a method which utilizes the transit time of ultrasonic pulses produced by magnetic fields.

SUMMARY OF THE INVENTION

The object of the invention is to provide a volume determination device permitting a particularly accurate determination of the volume in the case of minimum apparatus cost and whilst avoiding measurement errors caused by gas occlusion. In addition, a method is provided for the filling of a tank and for determining the filling level, which implement the advantages of the device according to the invention.

This object is achieved with a device according to claim 1 and a method according to claim 18.

The device according to the invention is based on the prior art in that the device for separating gas and the tank form an integrated unit, that a filling level measuring device is substantially provided in the interior of the tank for determining the position of at least one boundary surface of the medium in the tank and that the filling level measuring device has at least one dipstick. This device renders unnecessary the use of a separate air separator, although this would not appear possible on the basis of the prior art, particularly in view of the aforementioned DIN 19217: 1997-11. Air separation initially takes place in the tank to be filled or the filled tank, which is possible in that the volume measurement determined by level measurement takes place in an extremely precise manner in the tank and not, as in the prior art, exclusively through a flowmeter upstream of the tank. This considerably reduces apparatus costs.

The device according to the invention is particularly advantageous if the filling level measuring device has a transsonar displacement transducer coupled to a computer operating according to the magnetostrictive principle and which is equipped with at least one dipstick and at least one float, the float or floats being equipped with at least one magnet. The magnetostrictive principle is based on the phenomenon that two intersecting magnetic fields cause a deformation of the metal in which they are focussed. If an exciting current pulse is supplied to the dipstick, this leads to an axially symmetrical exciting magnetic field with respect to said dipstick. This interacts with the intersecting magnetic fields of the float magnets, so that there is a brief deformation and a resulting ultrasonic pulse in the dipstick acting as a waveguide. Knowing the velocity of sound in the waveguide, conclusions can be drawn from the position of the magnets and consequently of the float from the transit time of the ultrasonic pulse through the dipstick up to a receiver preferably positioned terminally on the dipstick. Displacement transducers of this type are well known. As a result of the thus equipped device it is possible to measure the float position to an order of magnitude of 10 æ. In addition, transsonar displacement transducers are long term-stable and consequently fulfil the strict legal requirements concerning calibration and measuring accuracy.

It is advantageous for the dipstick to be fixed to the top of the tank. This permits an easy removal and fitting of the dipstick, which can e.g. be useful in connection with maintenance and cleaning.

It is particularly advantageous to provide a reference signal generator on the underside of the tank substantially on the dipstick axis and for the dipstick to penetrate the reference signal generator. The reference signal generator emits a filling level-independent signal, so that the receiver receives two generally successive signals. Through the measurement of the transmit times of both signals and subtraction it is possible to eliminate a measurement error as a result of the e.g. temperature-caused linear extension of the dipstick. Through the placing of the reference signal generator on the underside of the tank and the dipstick penetrating the same, the float can pass into the lower area of the tank and generate corresponding filling level signals. As a result of the free penetration of the reference signal generator, the dipstick is not prevented from any temperature-caused extension, so that this can occur without stressing the system.

It is also advantageous to fix the dipstick to the underside of the tank, particularly in view of possibly varying design possibilities.

The displacement transducer is preferably operated with a measuring frequency of 500 Hz. As a result of this high repetition frequency a quasi-continuance measurement is possible.

The float is advantageously a double float for density measurement. Thus, apart from the filling level measurement, further information concerning the state of the medium is received.

It is further advantageous if the dipstick is surrounded by a smoothing or calming pipe, which has individual openings for the passage of the medium. This in particular leads to advantages in conjunction with the use of the device according to the invention in tank trucks. Through the movement of the truck the liquid surface is normally subject to considerable movement and the calming of this surface movement can take up an undesirably long period of time. As a result of the dipstick being surrounded by a calming pipe, which is connected to the remaining tank volume by openings using the principle of communicating pipes, in the decisive area, namely that area directly surrounding the dipstick, a much faster calming occurs and consequently there are inconsiderable time and cost economies.

It is also possible to use a computer, which has a software-based digital filter and which is suitable for converting the filling level values into volume values. It is possible to use a digital filter due to the high measuring frequency which is preferably present. In principle, it is possible to use all known filters, such as e.g. Bufterworth, Tschebyscheff or Bessel filters and the like. The computer has access to data describing the tank geometry, so that said conversion can take place. The advantage is that directly the interesting volume data and not the primarily measured filling level data can be displayed.

The filling level measuring device can also have a capacitive or potentiometric dipstick. An ultrasonic measuring device can also be used. This increases the flexibility concerning the possibilities of use, e.g. in conjunction with the different physical characteristics of the media in question.

Particularly in the case of symmetrical tanks, the dipstick is preferably arranged in the volumetric centre. This minimizes measuring errors as a result of an inclination of the tank.

It is also possible to provide devices for measuring the temperature of random components, preferably within the tank, the results of the temperature measurements being inputtable into the computer. Thus, there can be a correction of temperature-caused measuring errors on the software plane.

It is particularly advantageous if the computer is connected to a biaxial inclinometer. As a result data concerning the angular position of the tank can be inputted into the computer, which represents a further correction possibility for increasing measuring accuracy.

The system is preferably equipped with a sampler, which removes the sample quantities proportional to the conveyed volume. Such a proportional removal is advantageous, because it leads to a representative sample having the same qualitative composition as the total conveyed quantity. Proportional removal is possible, because a quasi-continuous volume measurement can be performed by the device according to the invention and therefore direct information on the volume flow is available.

In this connection or also for further increasing the measuring accuracy, the volume measurement can be additionally assisted by a possibly provided flowmeter. The use of such a flowmeter is particularly useful if already degassed milk is to be transferred from a smaller into a larger tank. It is pointed out in this connection that through the use of a small tank the absolute measuring accuracy is additionally increased. In particular, the measuring error is reduced in that the cross-sectional surface of the tank is decreased in favour of its height.

The conduit preferably has a valve means, which comprises a check or non-return valve and a valve controllable by the computer. The check valve and the controllable valve can also be implemented in the form of a single valve. The check valve prevents the flow back of medium from the tank into the container and forms the volume calibration zero, whereas the computer-controllable valve is e.g. closed if tank overfilling threatens. In order to continue takeover it is e.g. possible in this case to open a valve to a further tank or a farther chamber.

It can also be advantageous for the conduit to have coils. The coils can assist the degassing of the medium, because as a result of centrifugal force the medium is forced to the outer wall of the conduit, whilst the gas can pass out in the inner area. If the gas is provided with a possibility to leave the conduit system, as a result of this measure already partly degassed medium enters the tank.

The conveying device is preferably a self-priming impeller pump.

Advantageously the system is operated by vacuum.

It can also be advantageous for the computer to be connected with the adjustable or controllable valve or valves and/or with the conveying device. This makes it possible to control or regulate the delivery, as a function of random data supplied to the computer.

Preferably a computer is provided permitting the recording of random measured results and with which random process parameters can be controlled, monitored and regulated.

The method according to the invention is based on the prior art in that the gas separation at least partly takes place in the tank and that the filling level in the tank is measured by a filling level measuring device. The method makes it possible to obviate the use of a separate air separator, because the filling level and consequently the volume in the tank are measured, which avoids any need for an air separation prior to the passage of the medium through a flowmeter.

Preferably the filling level measuring method is based on the magnetostrictive principle, which permits a particularly accurate filling level measurement.

It is particularly advantageous if the filling level is determined by establishing the difference between the transit times of a signal generated at the location of a float and a signal generated at a fixed location with respect to the tank. As a result of such a subtraction the method is made independent of a possible e.g. temperature-caused extension of the dipstick.

Preferably a measurement of the temperature at random points within the system, particularly in the actual medium, the angular position of the tank and/or the density of the medium takes place, the measured results being supplied to a computer. As a result of these measurements the measured results can be advantageously corrected with respect to the volume. Particularly with regards to product detection or quality testing, density measurement plays an important part.

Preferably a computer is able, while incorporating random inputs, to open or close the valve to the tank, control and also monitor the conveying capacity of the conveying device.

A digital filter is preferably used in the computer for correcting surface fluctuations. This is in particular possible through the preferred use of a measuring frequency of 500 Hz, so that there is a quasi-continuous measurement. This permits the use of virtually random digital filters and the time necessary to obtain a reliable measured result is reduced by several orders of magnitude.

It is advantageous if part of the gas is separated before the medium enters the tank, because this further increases the filling rate and the reliability of the measurement.

It is also preferable during the filling of the tank to continuously measure the speed of rise of the float. With a correct operation of the installation this must be correlated with an expected pump efficiency, so that if correlation does not exist it can be concluded that there is a fault in the installation.

Preferably during the filling process a representative sample is taken, said sample quantity being correlated with the volume increase. The latter ensures the necessary product quality.

Advantageously use is made of a computer for recording random measured results and for controlling, monitoring and regulating random process parameters. This preferred integration permits a variable and central control of the system.

BRIEF DESCRIPTION OF THE SEVERAL VIEWS OF THE DRAWINGS

The invention and a prior art device will be described in greater detail hereinafter with reference to the attached drawings, wherein show.

DETAILED DESCRIPTION OF THE INVENTION

Figure 2:
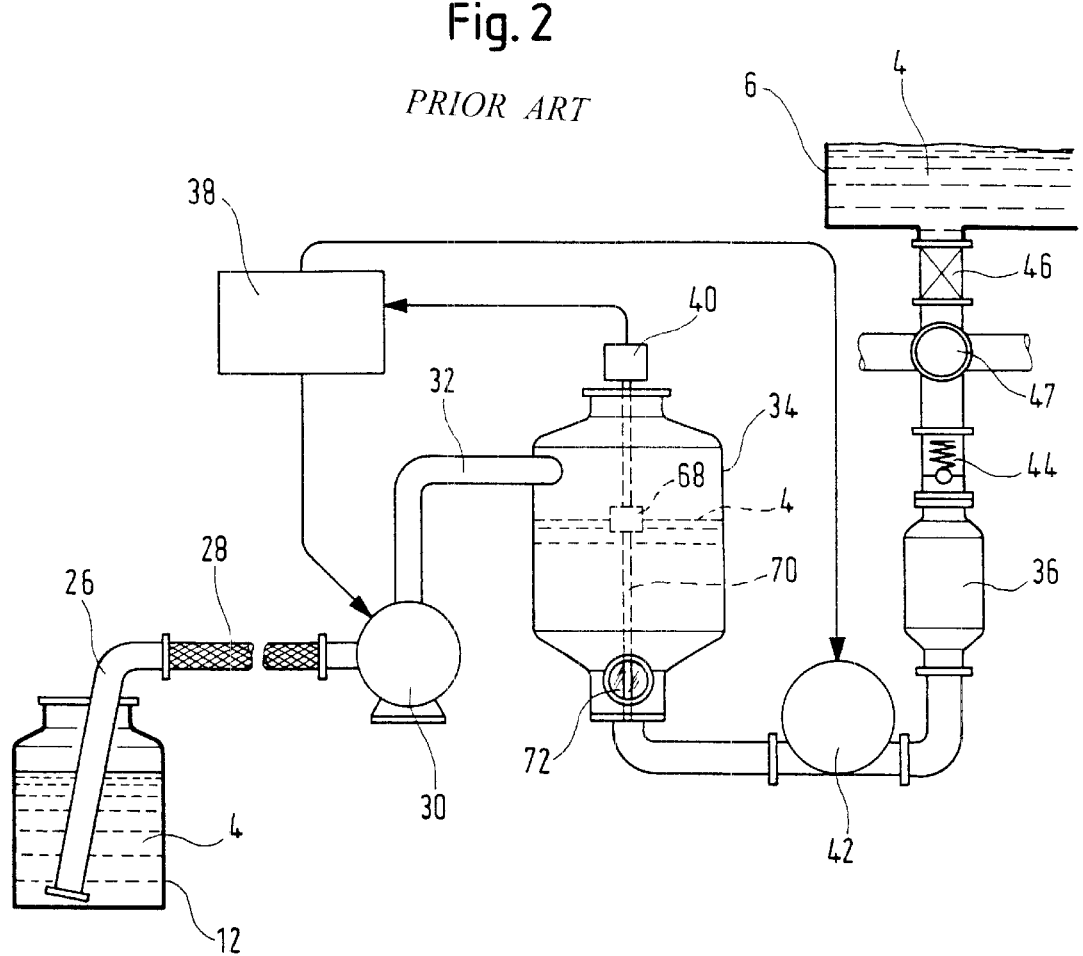
FIG. 2 A side view of a prior art device.

Firstly a prior art device is described in conjunction with FIG. 2. The medium 4, e.g. milk is sucked from a container 12 by means of a suction nozzle 26 connected by a flexible hose 28 to an impeller pump 30. Particularly at the start and end of removal, gas occlusions can occur during suction. The impeller pump 30 is of a self-priming nature and consequently does not need constant filling, which in particular facilitates the start of the removal process. From the impeller pump 30 the medium 4 is pumped via a pipe 32 into the gas measuring preventing device or air separator 34. In the air separator 34 the medium 4 is intermediately stored, so that during this time air occlusions can pass out into the area above the liquid surface. This ensures that the occluded air has at least passed out to a significant extent before reaching a following volume measuring installation 36. So that there is always a suitable quantity of medium 4 in air separator 34, the level of the medium 4 in said air separator 34 is regulated. The control unit 38 connected to a filling level measuring device 40 of the air separator 34 is responsible for said regulation or control. The control unit 38 is also connected to the impeller pump 30 and a centrifugal pump 42 positioned behind the outlet area of the air separator 34. Through a suitable control of these components by the control unit 38, it is possible to control the operation as a function of the filling level within the air separator. The control unit 38 is also important in connection with the calibration of the installation. At the start of acceptance the float 36 is at a starting level with respect to the dipstick 70. The starting level is visible for the customer or supplier through the inspection glass 72. The starting level is relevant for all acceptance processes and must be accurately "approached" again at the end of each acceptance. The centrifugal pump 42 delivers the medium 4 through a flowmeter 36 (e.g. MID or magnetic-inductive flowmeter) and a valve means 44, 46 into the tank 6 to be filled. The valve means has a check valve 44 and a valve 46, which can be opened or closed. For filling several tanks a distributor 48 is also provided in the valve area.

Figure 1:
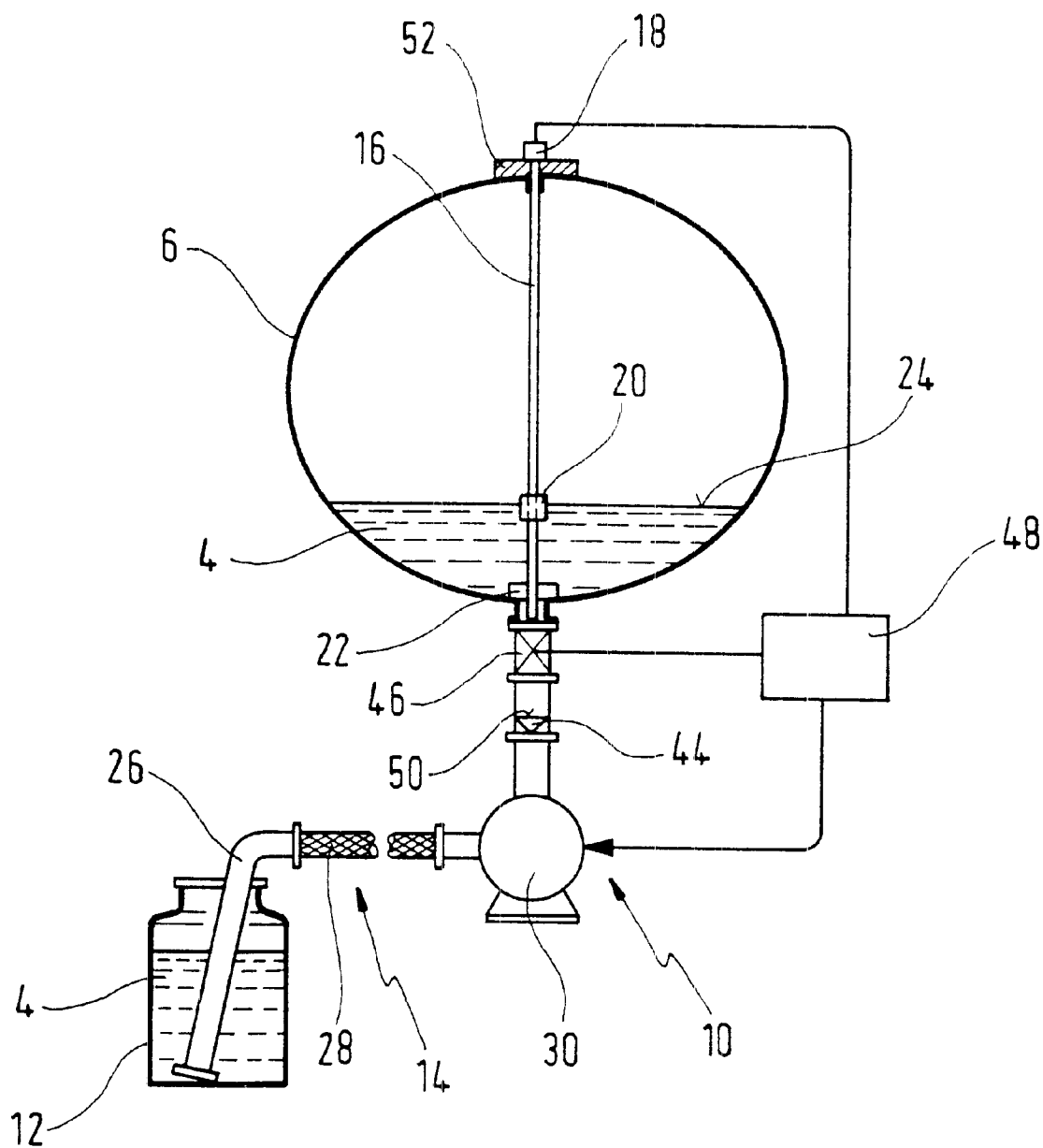
FIG. 1 A side view of the device according to the invention.

FIG. 1 shows a construction according to the present invention where, compared with the prior art of FIG. 2, there is a significantly reduced number of components.

Once again the medium 4 is sucked by means of a suction nozzle 26 from a container 12. The suction nozzle 26 is connected by means of a hose 28 to an impeller pump 30. From the impeller pump 30 the medium can pass via a check valve 44 and a valve 46, controllable by a computer 48, into the tank 6. The interior of the tank 6 is equipped with a filling level measuring device, which has a dipstick 16, a receiver area 18, a float 20 and a reference signal generator 22. The receiver area 18 is located on the dome cover 52 of the tank 6, to which the dipstick 16 is also fixed. With its surface 50 the check valve 44 simultaneously forms the calibration level. The computer 48 is connected to the receiver 8 of the filling level measuring device (16, 18, 20, 22), the valve 46 and the pump 30. Thus, the delivery of the pump 30 and the position of the valve 46 can be controlled by the computer 48 as a function of the filling level.

The filling level measuring device (16, 18, 20, 22) operates according to the magnetostrictive principle. This is based on the physical phenomenon that two intersecting magnetic fields cause a deformation of the metal in which they are focused. In the present case, one magnetic field is produced by a magnet connected to the float 20. It is also possible to provide several magnets. The exciting magnetic field is produced by an exciting current pulse supplied to the dipstick 16. Thus, at the time when the exciting current pulse arrives at the location of the float 20, an ultrasonic pulse is produced in the dipstick 16 and its transit time to the receiver area 18-is measured. Thus, with the knowledge of the velocity of sound in the dipstick 16, conclusions can be drawn regarding the position of the float 20 and the surface of the medium 4. In the lower region of the filling level measuring device (16, 18, 20, 22), a reference signal generator 22 through which the dipstick 16 freely passes is provided in the preferred embodiment. The other end of the dipstick 16 is fixed to the dome cover 52 of the tank 6. As the reference signal generator 22 has a fixed position relative to the tank 6, it is independent of possible, e.g. temperature-caused extensions of the dipstick 16. The receiver 18 is now able to receive both the signals of the reference signal generator 22 and the float 20. Through subtraction of the transit times it is possible to eliminate a measuring error due to e.g. temperature-caused length changes of the dipstick 16.

Figure 3:
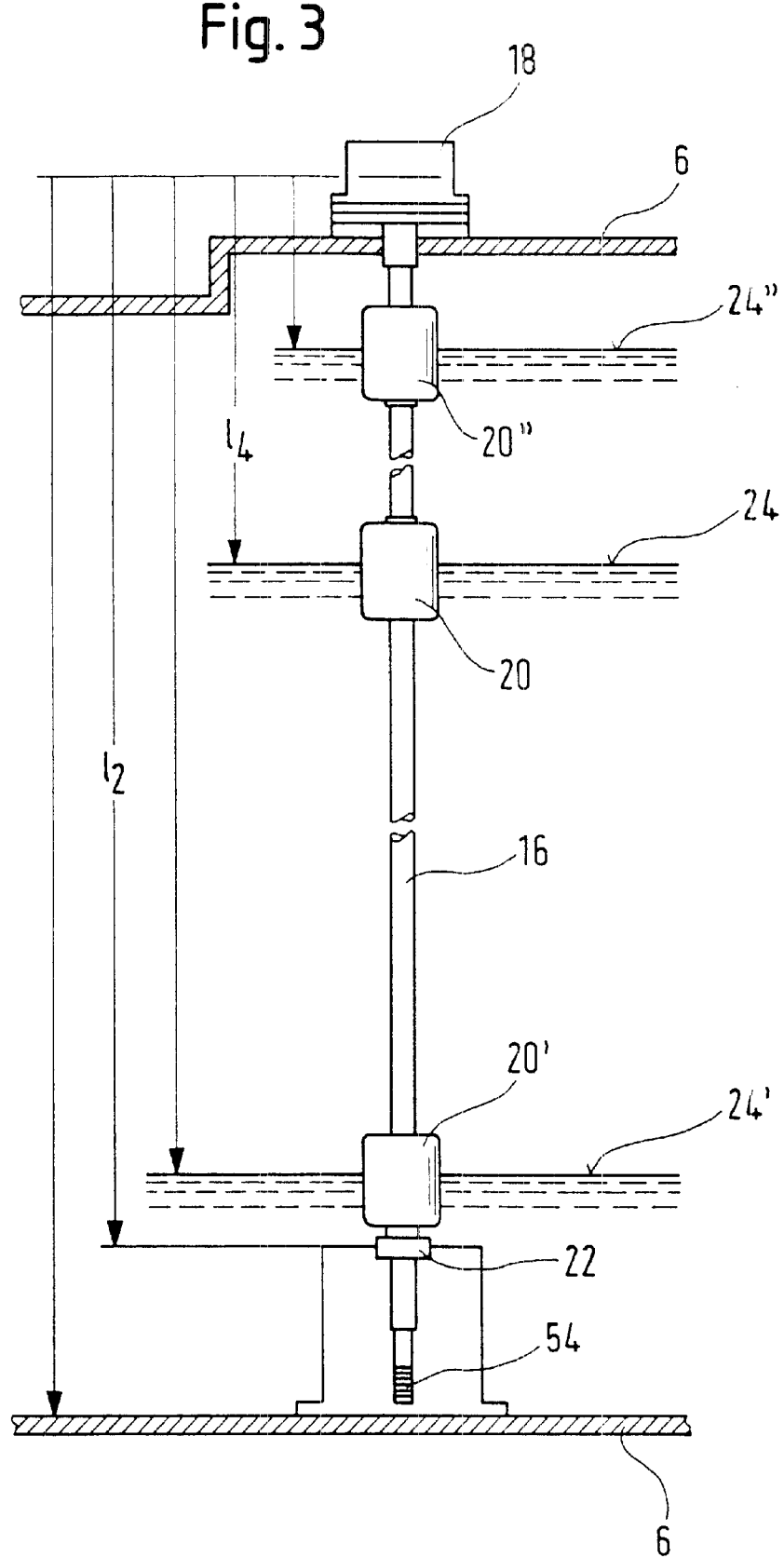
FIG. 3 A detail from a tank with a filling level measuring device for illustrating the differential method.

The differential measuring method is further illustrated by FIG. 3. Here a detail of tank 6 with three floats 20, 20', 20" associated with three possible levels is shown. Below the lower float 20' is shown a reference signal generator 22. The lower float 20 is at the minimum filling level, whereas the upper float 20" is at the maximum filling level. Below the reference signal generator 22 there is a damping zone 54 of the dipstick 16, in order to prevent measuring process-impairing reflections at the lower end of the dipstick 16. The differential method will now be explained using the example of the central float 20, which has a distance 14 from the receiver 18. As a result of this arrangement a temperature-caused extension of the dipstick 16 has no effect on the measurement, because effectively the distance 12–14 is determined, i.e. a quantity which eliminates by substraction the measuring error due to a length change.

Figure 4:
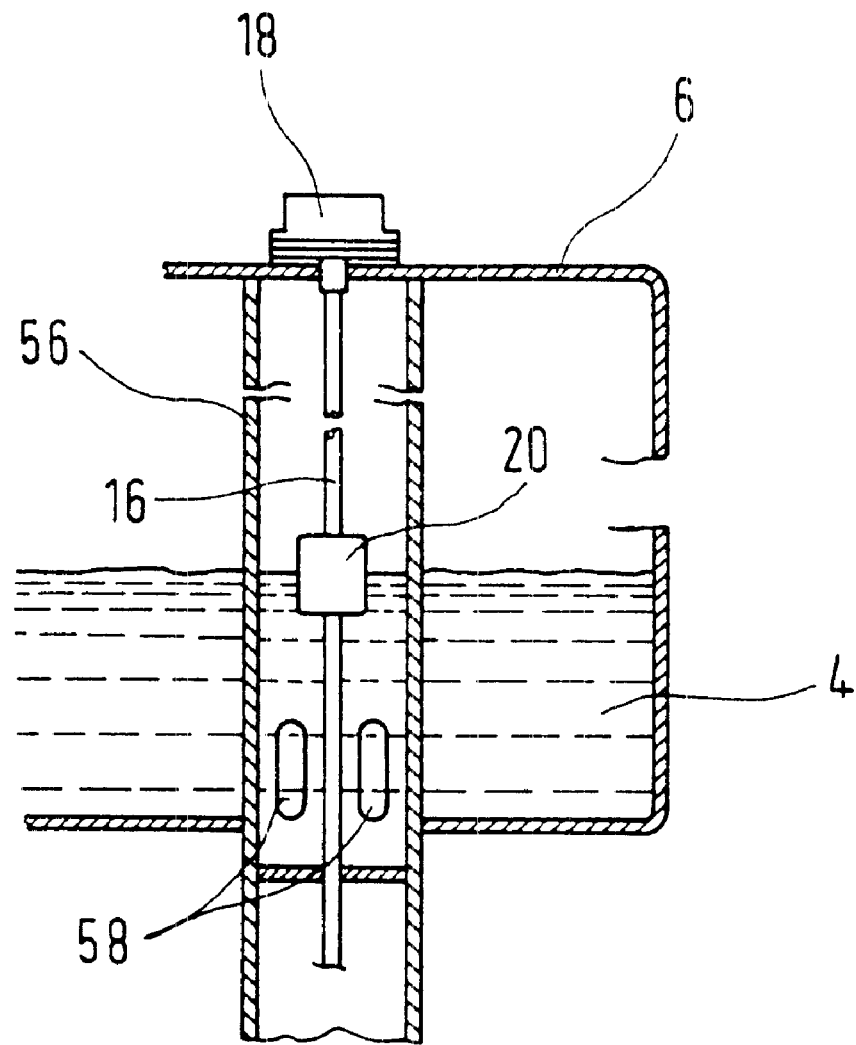
FIG. 4 Part of a tank in side view with components of a preferred embodiment of the invention.

FIG. 4 is a detail of a tank with a special design of the measuring device. Therein the dipstick 16 is surrounded by a smoothing or calming pipe 56. The interior of the calming pipe 56 is connected by means of one or more openings 58 to the remainder of the tank 6, so that on the basis of the principle of communicating pipes the medium 4 can assume the same filling level inside and outside the calming pipe. The effect of the calming pipe 56 is that the surface within this radially small area very rapidly becomes calm, as opposed to the slow calming of the much larger remaining surface of the medium 4. Particularly when using the device according to the invention in tank trucks, this has the advantage that a precise measurement is possible even a short time after stopping or even when the tanker is moving. It is pointed out in this connection that a correction of surface fluctuations can be performed as a result of the high measuring frequency of the method according to the invention (preferably about 500 Hz) even by digital filters in a computer, which is in any case present for controlling the system. It is particularly advantageous to use the digital filters in combination with a calming pipe 56 according to FIG. 4. It is also possible to use a RC filter.

Figure 5:
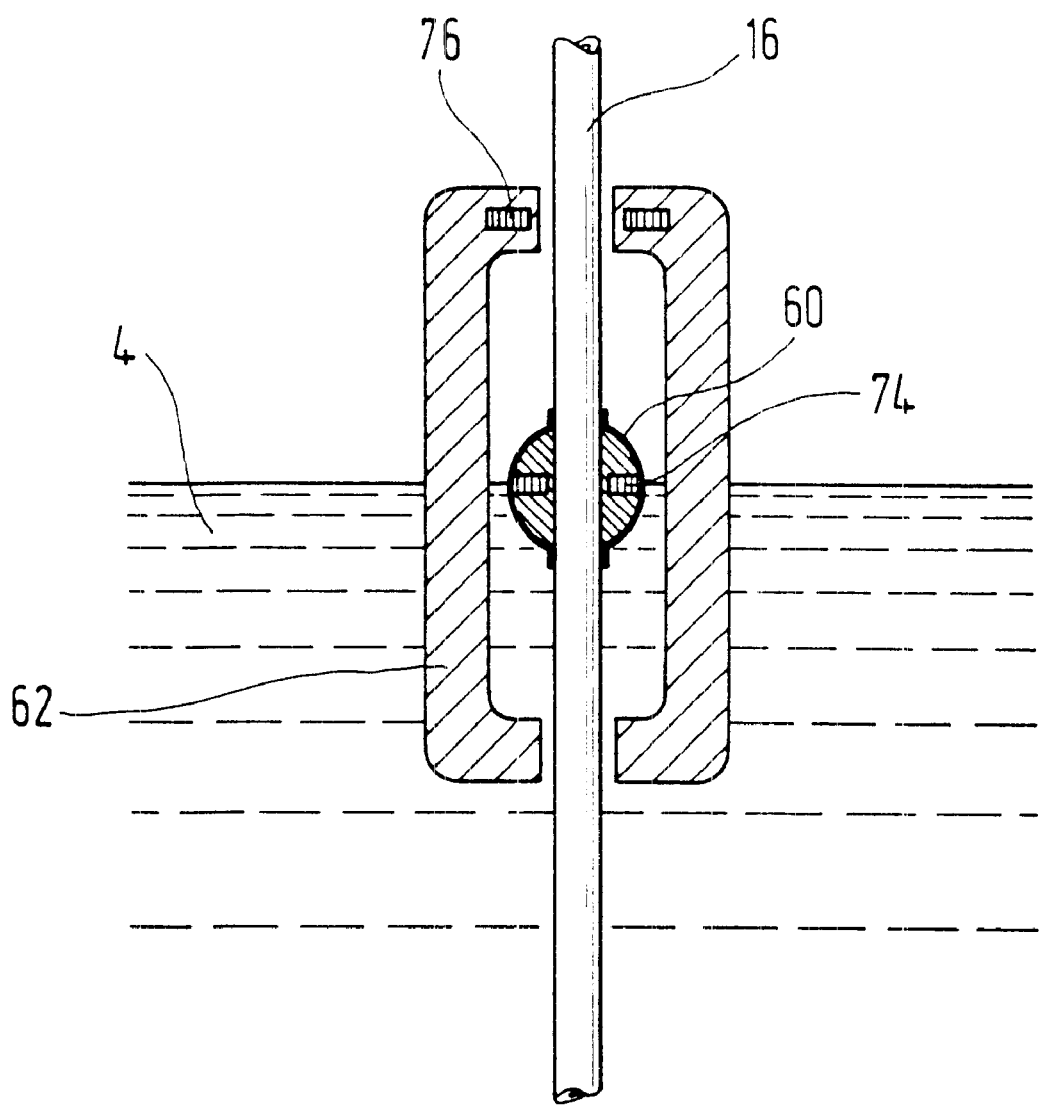
FIG. 5 A side view of components of a preferred embodiment of the invention for density measurement.

FIG. 5 shows a special embodiment of a float 20 for determining the density of the medium. The float 20 is in two parts, comprising a filling level float 60 and a density float 62. Both floats 60, 62 of the double float 20 have magnets 74, 76, so that through the transit time differences of the associated measurements conclusions can be drawn regarding the submergence depth of the density float 62. As this submergence depth of the density float 62 is dependent on the density of the medium 4, it is possible to calculate from the transit time difference the density of the medium 4. This provides further information on the medium 4, which can be used during the control process and which provides information on the quality of the product. The density measurement is particularly advantageous if the medium 4 is fuel. At a specific temperature different fuels have different densities so that, with the knowledge of the temperature, conclusions can be drawn on the basis of the density concerning the nature of the fuel (e.g. super lead-free). The density measurement combined with a temperature measurement can be used for identifying the medium 4.

Figure 6:
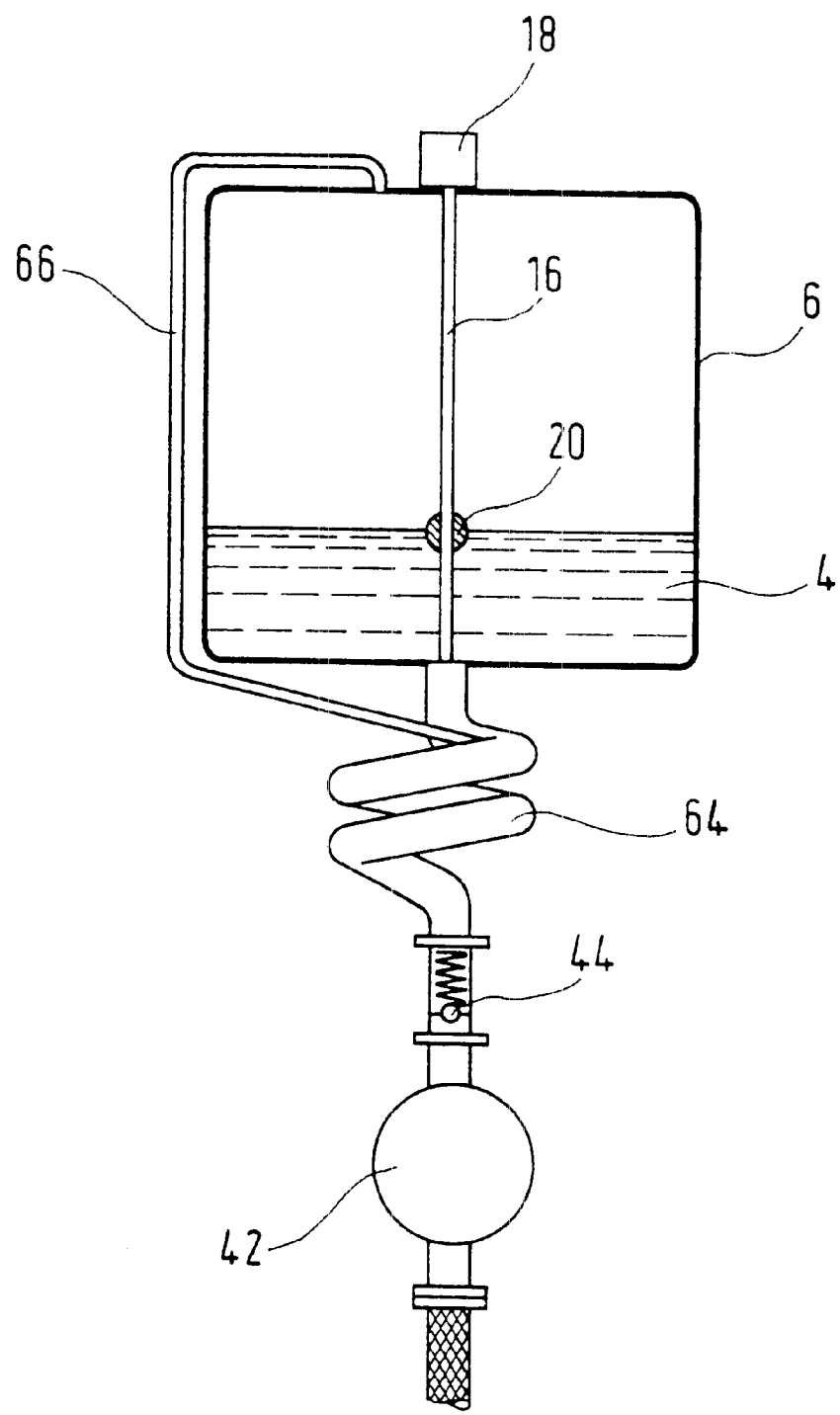
FIG. 6 A side view of part of the device according to the invention in a preferred embodiment for air separation.

FIG. 6 shows a possibility for bringing about in a simple manner a partial degassing of the medium 4 before the latter enters the tank 6. The pump 42 pumps the medium by means of a helically wound conduit 64 into the tank 6. As a result of the centrifugal forces which occur in the coiled conduit 64, the medium is mainly transported on the outer wall of said conduit, whereas gas occlusions can pass out in the inner area. If there is an outlet for the gas, which is connected by means of a vent line 66 to the tank 6, then a partial degassing already takes place before the medium 4 enters the tank 6.

The invention in particular has advantages in connection with liquid media. However, it is not limited to use with liquid media and instead still offers many advantages with viscous media or even loose material.

The features of the invention disclosed in the description, drawings and claims can be essential to the implementation of the invention either singly or in random combination.

What is claimed is:

1. A device for separating gas from a medium and conveying the medium (4) from a container (12) to a tank (6) and for determining the quantity of the medium (4), the device comprising:

a conduit (14) between the container (12) and the tank (6);

a conveyor (10) connected to the conduit (14);

a separator for separating gas from the medium (4), the separator being formed as an integrated unit with the tank;

a filling level measurer (16, 18, 20, 22) provided in the interior of the tank (6) for determining the position of at least one boundary surface (24) of the medium (4) in the tank (6) and the filling level measuring device (16, 18, 20, 22) having at least one dipstick (16).

2. A device according to claim 1, characterized in that the filling level measuring device (16, 18, 20, 22) is constituted by a transsonar displacement transducer coupled to a computer (48) and operating according to a magnetostrictive sensor and having at least one dipstick (16) and at least one float (20) and the float or floats (20) are provided with at least one magnet.

3. Device according to claim 1, characterized in that the dipstick (16) is fixed to the top of the tank (6).

4. A device according to claim 2, characterized in that a reference signal generator (22) is provided on the underside of the tank (6) on the axis of the dipstick (16) and the dipstick (16) penetrates the reference signal generator (22).

5. Device according to claim 1, characterized in that the dipstick (16) is fixed to the underside of the tank (6).

6. Device according to claim 1, characterized in that the filling level measuring device (16, 18, 20, 22) can be operated with a measuring frequency of 500 Hz.

7. Device according to claim 1, characterized in that the float (20) is constituted by a double float (60, 62) for density measurement.

8. Device according to claim 1, characterized in that the dipstick (16) is surrounded by a calming pipe (56), which has individual openings (58).

9. Device according to claim 1, characterized in that a computer (48) is provided, which has a software-based, digital filter and which is suitable for converting filling level values into volume values.

10. Device according to claim 1, characterized in that the filling level measuring device is constituted by a capacitive, potentiometric or ultrasonic measuring device.

11. Device according to claim 1, characterized in that, particularly in symmetrical tanks (6), the dipstick (16) is located in the volumetric centre.

12. A device according to claim 1, characterized in that at least one of a temperature measuring device and a biaxial inclinometer for measuring the angular position of the tank (6) is provided.

13. Device according to claim 1, characterized in that a flowmeter is located in the feedline to the tank (6) and a sampler is provided, the sample quantity being removable in proportion to the volume flow through the system.

14. Device according to claim 1, characterized in that the conduit (14) has a check valve (44) and one or more adjustable or controlling valves (46).

15. Device according to claim 1, characterized in that the conduit (14) has coils (64).

16. Device according to claim 1, characterized in that the conveying device (10) is an impeller pump.

17. A device according to claim 1, further comprising a computer (48) connected to at least one of an adjustable or controllable valve or valves (46) and a conveying device (10), the computer being able to record random measured results and to control, to monitor and to regulate random process parameters.

18. A method for conveying a medium (4) from a container (12) into a tank (6) and for determining the quantity of the medium (4), comprising the steps of:

conveying the medium (4) a conveying device (10) and a conduit (14);

separating absorbed gas from the medium (4);

the gas separating step taking place at least partially in the tank (6), and measuring a filling level in the tank (6).

19. A method according to claim 18, characterized in that the filling level measuring device (16, 18, 20, 22) operates according to a magnetostrictive sensor.

20. Method according to claim 1, characterized in that the filling level is determined by establishing the difference of the transit times of a signal generated at the location of a float and a signal generated at a fixed location (22) relative to the tank (6).

21. A method according to claim 18, characterized in that at least one or more of the following are performed (a) one or more temperature measurements are performed, (b) an angular position of the tank (6) is measured, and (c) a density of the medium(4) is measured; and the results are supplied to a computer (48).

22. Method according to claim 18, characterized in that a measuring frequency of 500 Hz is used.

23. Method according to claim 18, characterized in that part of the occluded gas is separated prior to the entry into the tank(6).

24. Method according to claim 4, characterized in that samples are taken during the filling process, the sample quantity being correlated with the transported volume.

25. Method according to claim 18, characterized in that with a computer (48) one or more of the following steps are performed:

(a) the valve position is controlled;

(b) the delivery is controlled and/or monitored;

(c) the filling level is continuously monitored;

(d) on the basis of a software-based digital filter the measurement of the filling level is evaluated; and (e) random measured results are recorded and random process parameters are controlled, monitored and regulated.

26. A device for separating gas from a medium and conveying the medium from a container to a tank and for determining the quantity of the medium, the device comprising:

a conduit between the container and the tank;

a conveying device connected to the conduit;

a separator for separating gas from the medium, the separator being formed as an integral unit with the tank;

a filling level measurer provided in the interior of the tank for determining the position of at least one boundary surface of the medium in the tank;

the filling level measuring device having at least one dipstick;

a calming pipe surrounding the dipstick, the calming pipe having individual openings; and a temperature measurer within the tank to measure the temperature of the medium and produce temperature data.

27. The device of claim 26, further comprising a computer for receiving the temperature data from the temperature measurer.

28. A method for conveying a medium from a container into a tank and for determining the quantity of the medium, comprising the steps of:

conveying the medium via a conveying device and a conduit;

separating absorbed gas from the medium, the gas separating step taking place a least partially in the tank;

measuring a filling level in the tank with a device including a dipstick;

calming the medium around the dipstick; and measuring the temperature of the medium within the tank to produce temperature data.

* * * * *